(12) United States Patent
Zhao et al.

(10) Patent No.: US 11,981,296 B2
(45) Date of Patent: May 14, 2024

(54) NOZZLE INSERT FOR VEHICLE SENSOR CLEANING

(71) Applicant: GM Global Technology Operations LLC, Detroit, MI (US)

(72) Inventors: Guangzhi A. Zhao, Troy, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 17/670,815

(22) Filed: Feb. 14, 2022

(65) Prior Publication Data

US 2023/0256942 A1    Aug. 17, 2023

(51) Int. Cl.
*B60S 1/54* (2006.01)
*B60S 1/56* (2006.01)

(52) U.S. Cl.
CPC .. *B60S 1/54* (2013.01); *B60S 1/56* (2013.01)

(58) Field of Classification Search
CPC ...... B60S 1/54; B60S 1/56; B60S 1/46; B60S 1/52; B05B 1/14; B05B 1/08; B05B 1/10
USPC ........................................................... 15/404
See application file for complete search history.

(56) References Cited

U.S. PATENT DOCUMENTS

| | | | |
|---|---|---|---|
| 9,988,020 B2* | 6/2018 | Weitzel | B05B 1/08 |
| 2010/0078509 A1* | 4/2010 | Utz | B05B 1/10 239/590 |
| 2019/0077377 A1* | 3/2019 | Schmidt | B60S 1/0848 |

FOREIGN PATENT DOCUMENTS

KR    20120036196 A    * 10/2010

* cited by examiner

*Primary Examiner* — Katina N. Henson
(74) *Attorney, Agent, or Firm* — CANTOR COLBURN LLP

(57) ABSTRACT

A nozzle in a vehicle includes a nozzle insert to provide pulsed flow of a cleaning agent from an outlet to clean a sensor of the vehicle. The nozzle also includes a cleaning agent supply line to provide the cleaning agent to an inlet of the nozzle insert.

20 Claims, 4 Drawing Sheets

NOZZLE INSERT FOR VEHICLE SENSOR CLEANING

INTRODUCTION

The subject disclosure relates to a nozzle insert for vehicle sensor cleaning.

Vehicles (e.g., automobiles, motorcycles, trucks, construction equipment, automated factory equipment, farm equipment) increasingly include sensors. Some types of sensors (e.g., inertial measurement unit (IMU), steering wheel angle sensor) may provide information about the vehicle while other types of sensors (e.g., camera, radar system, lidar system) may provide information about the surroundings of the vehicle. These sensors provide information to a driver, facilitate semi-autonomous operation (e.g., automatic braking, collision avoidance), or allow autonomous operation of the vehicle. Sensor operation may be diminished partly or entirely by anything that occludes the sensor field of view. Accordingly, it is desirable to provide a nozzle insert for vehicle sensor cleaning.

SUMMARY

In one exemplary embodiment, a nozzle in a vehicle includes a nozzle insert to provide pulsed flow of a cleaning agent from an outlet to clean a sensor of the vehicle. The nozzle also includes a cleaning agent supply line to provide the cleaning agent to an inlet of the nozzle insert.

In addition to one or more of the features described herein, the nozzle also includes a cover to cover the nozzle insert.

In addition to one or more of the features described herein, the nozzle also includes a holder that is covered by the cover. The holder holds the nozzle insert.

In addition to one or more of the features described herein, the cover and the holder include openings to expose the outlet of the nozzle insert.

In addition to one or more of the features described herein, the nozzle also includes a support to hold the nozzle insert within the holder.

In addition to one or more of the features described herein, the nozzle insert includes a track between the inlet and the outlet and a ball to be trapped in the track. The ball varies a density of flow of the cleaning agent at the outlet to create the pulsed flow.

In addition to one or more of the features described herein, the track is a circular track.

In addition to one or more of the features described herein, an opening of the inlet is larger than an opening of the outlet such that pressure of the cleaning agent exiting the outlet is higher than a pressure of the cleaning agent entering the inlet and flow velocity is higher at the outlet than at the inlet.

In addition to one or more of the features described herein, the cleaning agent is compressed air from a compressor of the vehicle.

In addition to one or more of the features described herein, a controller of the vehicle controls output of the pulsed flow of the cleaning agent via the outlet.

In another exemplary embodiment, a method of assembling a nozzle for use in a vehicle includes configuring a nozzle insert to provide pulsed flow of a cleaning agent from an outlet to clean a sensor of the vehicle. The method also includes coupling a cleaning agent supply line to the nozzle insert to provide the cleaning agent to an inlet of the nozzle insert.

In addition to one or more of the features described herein, the method also includes arranging a cover to cover the nozzle insert.

In addition to one or more of the features described herein, the method also includes arranging a holder that is covered by the cover, the holder holding the nozzle insert.

In addition to one or more of the features described herein, the method also includes arranging openings in the cover and the holder to expose the outlet of the nozzle insert.

In addition to one or more of the features described herein, the method also includes arranging a support to hold the nozzle insert within the holder.

In addition to one or more of the features described herein, the configuring the nozzle insert includes the nozzle insert including a track between the inlet and the outlet and disposing a ball to be trapped in the track to vary a density of flow of the cleaning agent at the outlet to create the pulsed flow.

In addition to one or more of the features described herein, the including the track includes the track being a circular track.

In addition to one or more of the features described herein, the configuring the nozzle insert includes forming an opening of the inlet to be larger than an opening of the outlet such that flow velocity is higher at the outlet than at the inlet.

In addition to one or more of the features described herein, the method also includes coupling the nozzle to a compressor of the vehicle such that the cleaning agent is compressed air from the compressor.

In addition to one or more of the features described herein, the method also includes coupling the nozzle to a controller of the vehicle such that the controller controls output of the pulsed flow of the cleaning agent via the outlet.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
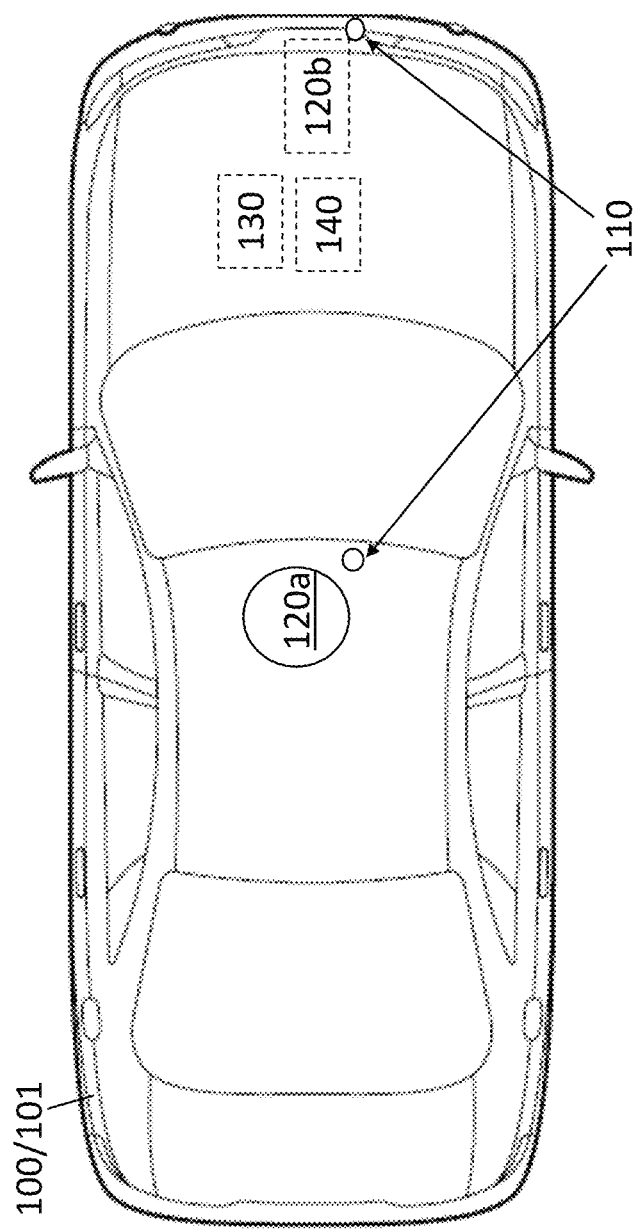
FIG. 1 shows a vehicle with a nozzle insert for vehicle sensor cleaning according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to a nozzle insert for vehicle sensor cleaning. While a vehicle sensor and a nozzle insert for a nozzle providing air are specifically discussed for explanatory purposes, the nozzle insert according to one or more embodiments may be used in other applications that may also benefit from high velocity pulsating flow and may provide pulsating flow of another gas or of a liquid. As previously noted, vehicle sensors facilitate driver warnings, semi-autonomous maneuvers, or autonomous operation. As also noted, when one or more sensors are occluded, their operation may be diminished partly or completely. Autonomous operation, in particular, may not be possible without reliable sensor-based information, and preventing sensor occlusion may be especially necessary in these types of vehicles.

According to a prior approach, nozzles deliver water or air at a constant flow rate to a sensor surface (e.g., camera lens) to clean it off. According to one or more embodiments detailed herein, a nozzle insert facilitates an increase in the flow velocity as compared with the flow velocity entering the nozzle insert and also facilitates creating pulsation. In the exemplary case of the nozzle delivering compressed air, the increased flow velocity of compressed air that is output by the nozzle insert, as compared with velocity into the nozzle insert, and the pulsation of the compressed air that is output by the nozzle insert results in less compressed air being needed to effectively clean a sensor. This means that less energy is required for the compressor that supplies the compressed air. In addition, the nozzle insert is a passive device that does not require expending power to achieve the higher flow velocity or pulsation.

In accordance with an exemplary embodiment, FIG. 1 shows a vehicle 100 with a nozzle insert 210 (FIG. 2) for vehicle sensor cleaning. The exemplary vehicle 100 shown in FIG. 1 is an automobile 101. The vehicle 100 is shown with two exemplary sensors 120a, 120b (generally referred to as 120). For example, sensor 120a may be a lidar system while sensor 120b is a radar system or a camera. The numbers and arrangement of sensors 120 around the vehicle 100 are not intended to be limited by the exemplary illustration. Each of the sensors 120 is shown with a corresponding cleaning nozzle 110, but a nozzle 110 may only be co-located with a subset of all the sensors 120 according to alternate embodiments. A given nozzle 110 corresponding to a given sensor 120 may be positioned such that it outputs cleaning agent 225 (FIG. 2) as a pulsed flow on a surface of the sensor 120 that is exposed to the environment outside the vehicle 100 (e.g., lens of a camera or lidar system).

A compressor 130 may supply compressed air as the cleaning agent 225 that is output via pulsed flow by the nozzle insert 210. However, the source and material of the cleaning agent 225 is not limited. In addition, multiple nozzles 110 may be used for a given sensor 120, with one of the nozzles 110 providing pulsed flow (e.g., of compressed air), according to one or more embodiments, and others providing other materials (e.g., water). A controller 140 of the vehicle 100 may control the compressor 130 and the nozzles 110. The controller 140 may trigger the supply of compressed air by the compressor 130, water, or other cleaning agent 225, as well as the output of pulsed flow (i.e., cleaning) by one or more nozzles 110.

The output of pulsed flow by one or more nozzles 110, according to one or more embodiments, may be controlled to be periodic or event-based. For example, the controller 140 may trigger one or more nozzles 110 based on sensing rain, detecting an occlusion (e.g., camera image indicates debris on the lens), or the like. As previously noted, in an autonomous vehicle 100 in particular, the sensors 120 may be mission-critical, and cessation of information from one or more sensors 120 due to an occlusion may require the vehicle 100 to stop the trip. The controller 140 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
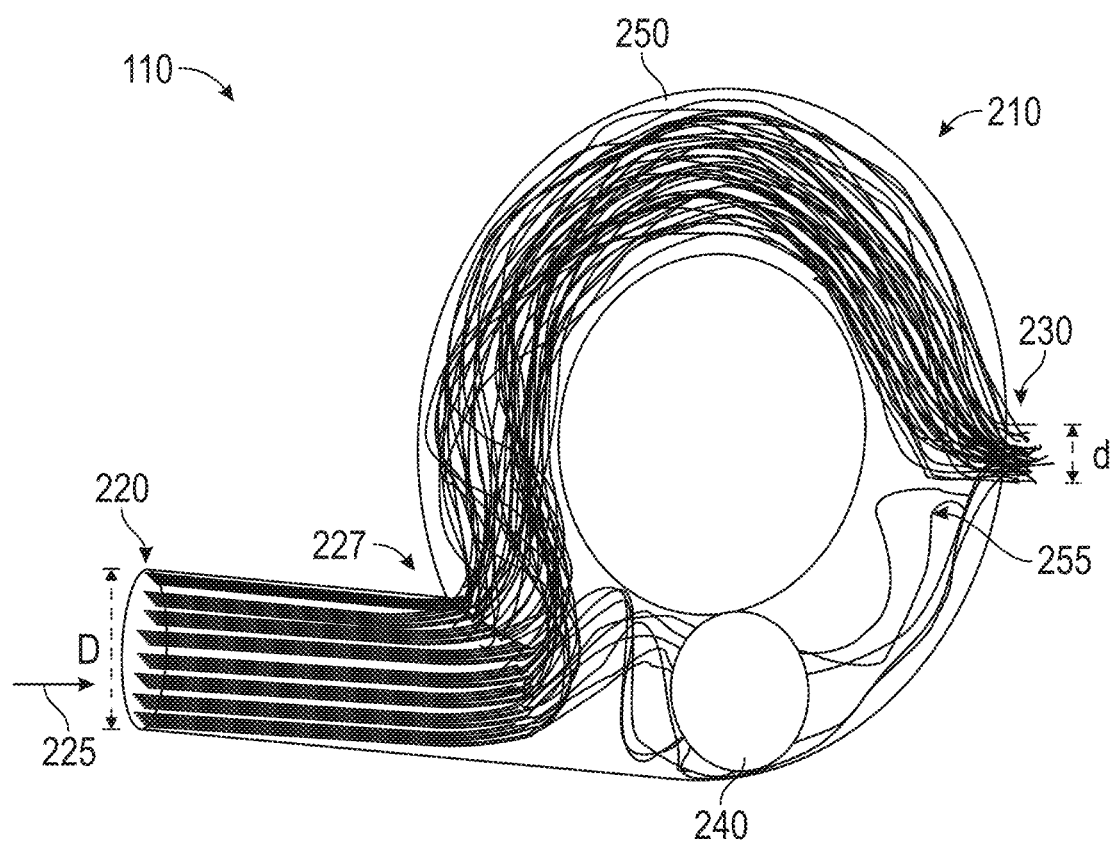
FIG. 2 details a nozzle insert for cleaning a sensor of a vehicle according to one or more embodiments.

FIG. 2 details a nozzle insert 210 for cleaning a sensor 120 of a vehicle 100 according to one or more embodiments. The nozzle insert 210 is shown with an inlet 220, at which the cleaning agent 225 (e.g., compressed air from the compressor 130) enters, and an outlet 230, from which pulsed flow of the cleaning agent 225 is provided and may be directed to a sensor 120 (e.g., camera lens). As shown, the inlet 220 has a relatively larger opening than the outlet 230. That is, the diameter D of the inlet 220 is larger than the diameter d of the outlet 230 in the exemplary illustration. While the inlet 220 and outlet 230 are shown with a circular cross-sectional shape, the illustration is not intended to limit the cross-sectional shape of the inlet 220 and outlet 230, which may not be the same. As a result of the difference, pressure is higher for flow exiting the outlet 230 as compared with flow entering the inlet 220. Consequently, velocity of the cleaning agent 225 exiting the outlet 230 is higher than the velocity of flow entering the inlet 220.

The nozzle insert 210 is also shown to include a track 250 with a ball 240 that traverses the track 250. From the perspective of the ball 240, the track 250 is a closed track, because the outlet 230 is too small for the ball 240 to exit the track, and the inlet 220 is blocked for exit of the ball 240. The inlet 220 may be blocked for passage of the ball 240 based on the sizing of an intersection 227 of the inlet 220 and the track 250 or based on barriers added at the intersection 227, for example. That is, the ball 240 is trapped in the track 250. While the track 250 is shown as circular, the exemplary illustration is not intended to limit the track 250 to being a perfect circle. The track 250 may be oval, for example, or another shape that facilitates providing the pulsed flow.

As previously noted, the difference in size of the inlet 220 and outlet 230 results in higher velocity flow exiting the outlet 230 than entering at the inlet 220. The traversal around the track 250 by the ball 240, which is propelled by incoming flow of the cleaning agent 225 via the inlet 220, results in pulsed flow of the cleaning agent 225 exiting the outlet 230. As the illustrated exemplary flow lines 255 indicate, the inclusion of the ball 240 within the track of the nozzle insert 210 is a passive way to disturb what would otherwise be constant flow of the cleaning agent 225 to instead create a changing flow density at the outlet 230 that manifests as the pulsed flow. Whether the ball 240 remains in one area of the track 250 or circulates around the track 250 may be based on the velocity of flow of the incoming cleaning agent 225.

Figure 3B:
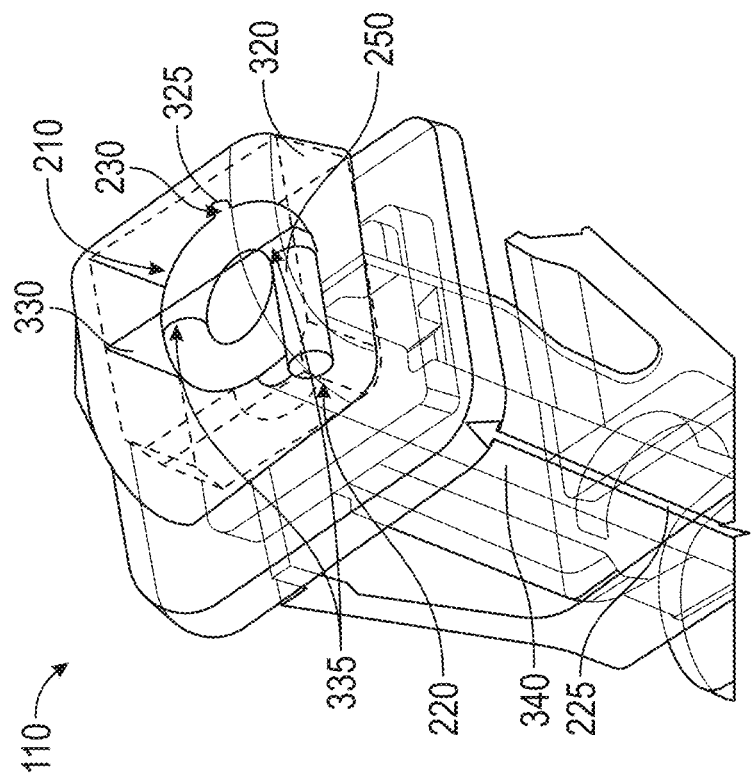
FIG. 3B is a transparent isometric view of the side of the nozzle shown in FIG. 3A.
Figure 3A:
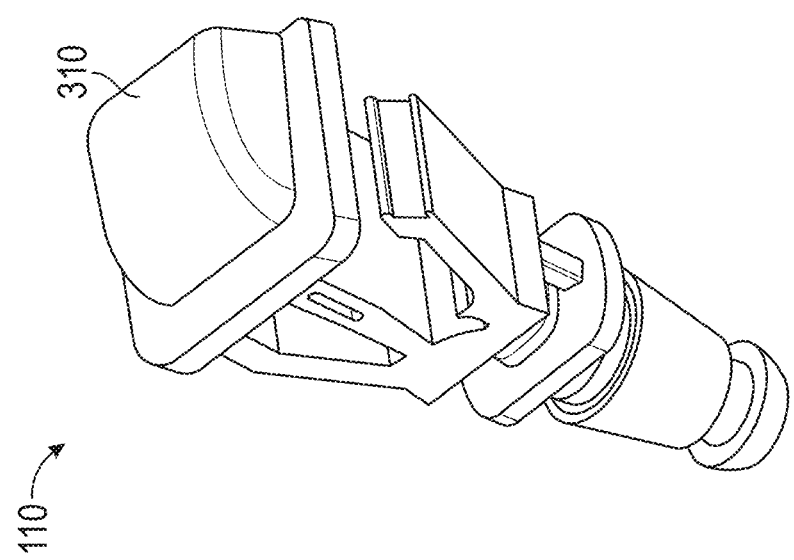
FIG. 3A is an isometric view of a side of the nozzle according to one or more embodiments.

FIGS. 3A and 3B are isometric views of a side of the nozzle 110 according to one or more embodiments. FIG. 3A shows a cover 310 that protects the nozzle insert 210 and obscures its view. FIG. 3B shows a transparent view of the nozzle 110 shown in FIG. 3A. The transparent view reveals the nozzle insert 210 within the cover 310. From the perspective shown in FIGS. 3A and 3B, the inlet 220 is visible and is supplied with cleaning agent 225 via a cleaning agent supply line 340. The cleaning agent supply line 340 may be from the compressor 130 and may supply compressed air as the cleaning agent 225, for example. The nozzle insert 210 is shown secured in a holder 320 with an additional support 330 that keeps the nozzle insert 210 in place within the holder 320. The support 330 extends across the holder 320 with openings 335 to accommodate the track 250, as shown. The outlet 230 extends through an opening 325 in the holder 320.

Figure 4B:
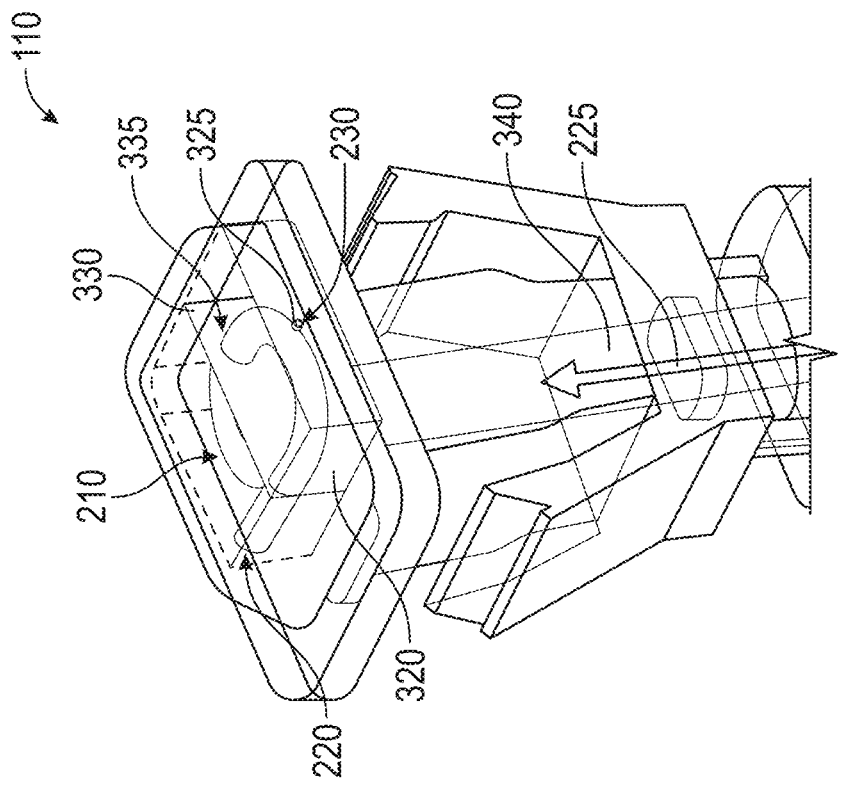
FIG. 4B is a transparent isometric view of the side of the nozzle shown in FIG. 4A.
Figure 4A:
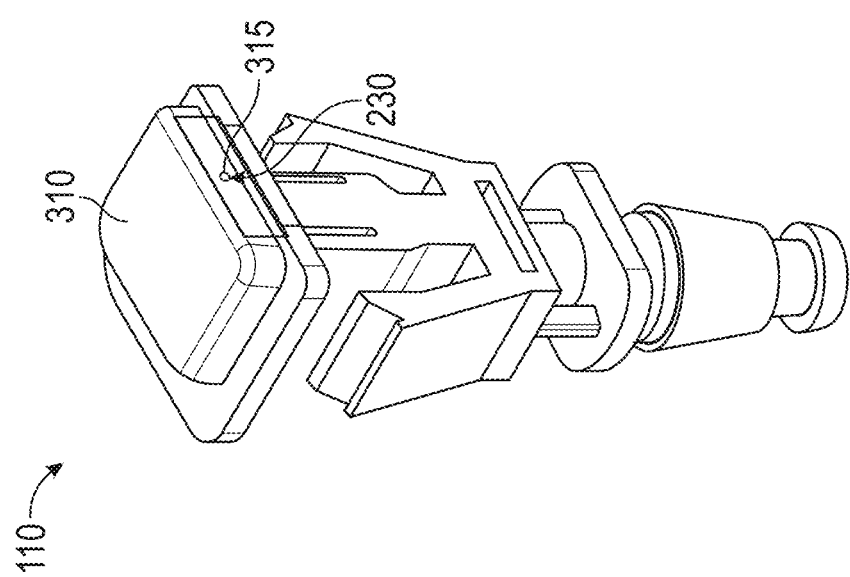
FIG. 4A is an isometric view of a side of the nozzle according to one or more embodiments.

FIGS. 4A and 4B are isometric views of a side of the nozzle 110, according to one or more embodiments, that is opposite the side shown in FIGS. 3A and 3B. FIG. 4B shows the cover 310. The perspective shown in FIGS. 4A and 4B makes visible the opening 315 in the cover 310 through which the outlet 230 of the nozzle insert 210 extends. FIG. 4B is a transparent view of the nozzle 110 shown in FIG. 4A. The holder 320 and the additional support 330 are shown. The inlet 220 that is supplied with cleaning agent 225 by the cleaning agent supply line 340 is shown in the back of the nozzle 110 according to the view in FIGS. 4A and 4B. The opening 325 in the holder 320 is shown. The outlet 230 of the nozzle insert 210 passes through the opening 325 in the holder 320 and then the opening 315 in the cover 310 in order to provide the pulsed flow of cleaning agent 225 to clean a sensor 120 of the vehicle 100.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A nozzle in a vehicle, the nozzle comprising:
   a nozzle insert configured to provide pulsed flow of a cleaning agent from an outlet to clean a sensor of the vehicle; and
   a cleaning agent supply line configured to provide the cleaning agent to an inlet of the nozzle insert,
   wherein the nozzle insert includes a track between the inlet and the outlet and a ball configured to be trapped in the track, the ball varying a density of flow of the cleaning agent at the outlet to create the pulsed flow, and
   wherein the track is circular or an oval.

2. The nozzle according to claim 1, further comprising a cover configured to cover the nozzle insert.

3. The nozzle according to claim 2, further comprising a holder that is covered by the cover, the holder being configured to hold the nozzle insert.

4. The nozzle according to claim 3, wherein the cover and the holder include openings configured to expose the outlet of the nozzle insert.

5. The nozzle according to claim 3, further comprising a support configured to hold the nozzle insert within the holder.

6. The nozzle according to claim 1, wherein the track is a circular track.

7. The nozzle according to claim 1, wherein an opening of the inlet is larger than an opening of the outlet such that pressure of the cleaning agent exiting the outlet is higher than a pressure of the cleaning agent entering the inlet and flow velocity is higher at the outlet than at the inlet.

8. The nozzle according to claim 1, wherein the cleaning agent is compressed air from a compressor of the vehicle.

9. The nozzle according to claim 1, wherein a controller of the vehicle controls output of the pulsed flow of the cleaning agent via the outlet.

10. The nozzle according to claim 1, wherein the ball blocks flow from the outlet when passing over the outlet.

11. A method of assembling a nozzle for use in a vehicle, the method comprising:
    configuring a nozzle insert to provide pulsed flow of a cleaning agent from an outlet to clean a sensor of the vehicle; and
    coupling a cleaning agent supply line to the nozzle insert to provide the cleaning agent to an inlet of the nozzle insert,
    wherein the configuring the nozzle insert includes the nozzle insert including a track between the inlet and the outlet and disposing a ball to be trapped in the track to vary a density of flow of the cleaning agent at the outlet to create the pulsed flow, and
    wherein the track is circular or an oval.

12. The method according to claim 11, further comprising arranging a cover to cover the nozzle insert.

13. The method according to claim 12, further comprising arranging a holder that is covered by the cover, the holder holding the nozzle insert.

14. The method according to claim 13, further comprising arranging openings in the cover and the holder to expose the outlet of the nozzle insert.

15. The method according to claim 13, further comprising arranging a support to hold the nozzle insert within the holder.

16. The method according to claim 11, wherein the including the track includes the track being a circular track.

17. The method according to claim 11, wherein the configuring the nozzle insert includes forming an opening of the inlet to be larger than an opening of the outlet such that flow velocity is higher at the outlet than at the inlet.

18. The method according to claim 11, further comprising coupling the nozzle to a compressor of the vehicle such that the cleaning agent is compressed air from the compressor.

19. The method according to claim 11, further comprising coupling the nozzle to a controller of the vehicle such that the controller controls output of the pulsed flow of the cleaning agent via the outlet.

20. The method according to claim 11, wherein the ball blocks flow from the outlet when passing over the outlet.

* * * * *